(12) United States Patent
Turner

(10) Patent No.: US 9,254,891 B1
(45) Date of Patent: Feb. 9, 2016

(54) MARINE VESSEL HULL

(71) Applicant: James Frederick Turner, Amisk (CA)

(72) Inventor: James Frederick Turner, Amisk (CA)

( * ) Notice: Subject to any disclaimer, the term of this patent is extended or adjusted under 35 U.S.C. 154(b) by 0 days.

(21) Appl. No.: 14/526,845

(22) Filed: Oct. 29, 2014

(51) Int. Cl.
*B63B 1/20* (2006.01)
*B63B 1/04* (2006.01)

(52) U.S. Cl.
CPC .. *B63B 1/042* (2013.01); *B63B 1/20* (2013.01)

(58) Field of Classification Search
CPC .............. B63B 1/20; B63B 1/12; B63B 1/38; B63B 1/042
See application file for complete search history.

(56) References Cited

U.S. PATENT DOCUMENTS

| | | | |
|---|---|---|---|
| 1,412,848 A * | 4/1922 | Dunajeff | 114/289 |
| 3,126,856 A * | 3/1964 | Fuller | 114/290 |
| 3,146,752 A * | 9/1964 | Ford | 114/67 A |
| 3,226,739 A * | 1/1966 | Noe | 114/355 |
| 3,470,839 A | 10/1969 | Faul et al. | |
| 4,031,841 A | 6/1977 | Bredt | |
| 5,063,870 A | 11/1991 | Wagner | |
| 5,218,918 A | 6/1993 | Cline | |
| 5,549,071 A | 8/1996 | Pigeon et al. | |
| 5,619,944 A | 4/1997 | Baker | |
| 5,934,218 A | 8/1999 | Chen | |
| 6,837,176 B1 | 1/2005 | Rogerson | |
| 7,752,986 B2 | 7/2010 | Van Krieken | |
| 8,757,085 B1 | 6/2014 | Cain | |
| 8,783,200 B1 | 7/2014 | Meyers | |
| 2005/0064768 A1 | 3/2005 | Lowe | |
| 2011/0232557 A1 | 9/2011 | Kilgore | |

FOREIGN PATENT DOCUMENTS

| | | |
|---|---|---|
| CA | 2641890 A1 | 4/2009 |
| EP | 2314504 A1 | 4/2011 |

* cited by examiner

*Primary Examiner* — Edwin Swinehart

(57) ABSTRACT

A marine vessel hull is disclosed herein. The marine vessel hull includes a bottom surface. The marine vessel hull also includes at least first and second planing skis projecting from the bottom surface. Each of the first and second planing skis includes at least one side extending substantially perpendicular to the bottom surface. The first and second planing skis are sized to be submerged when the marine vessel hull is stationary in water. The bottom surface is substantially flat laterally between the first and second planing skis.

17 Claims, 3 Drawing Sheets

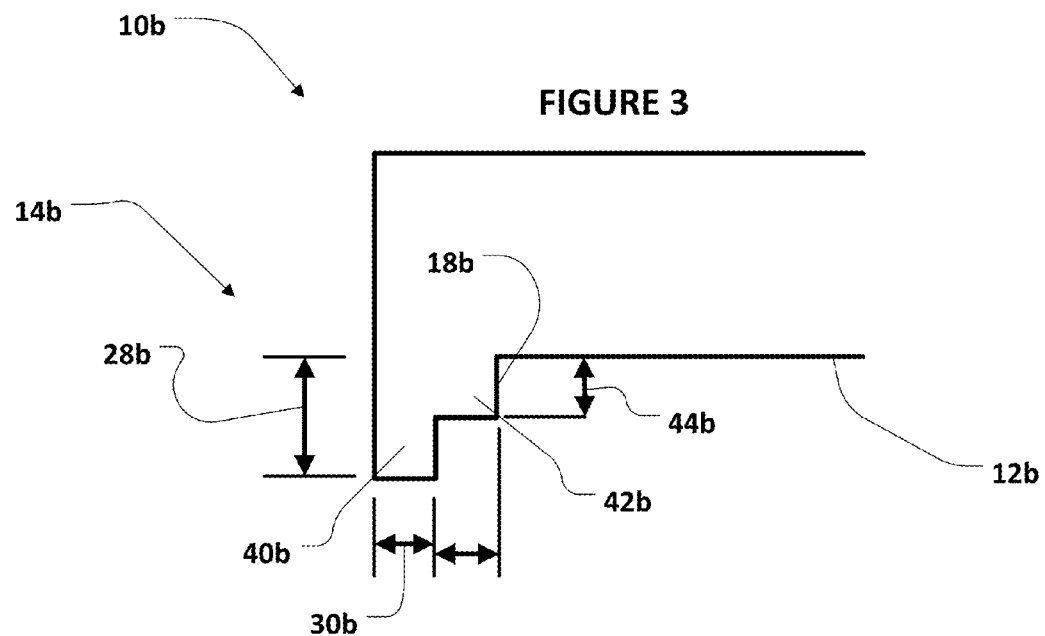
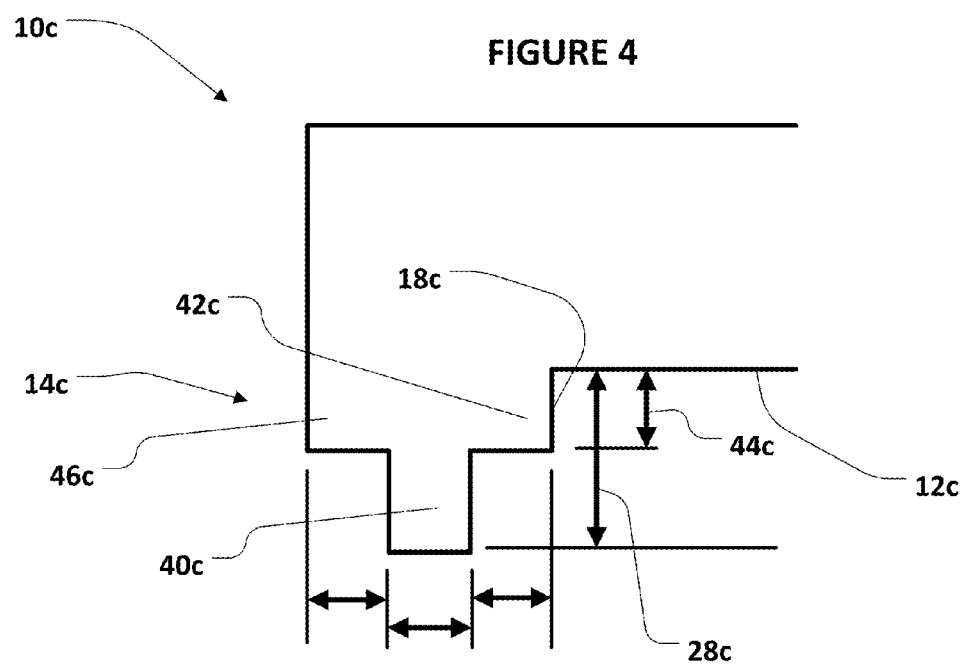

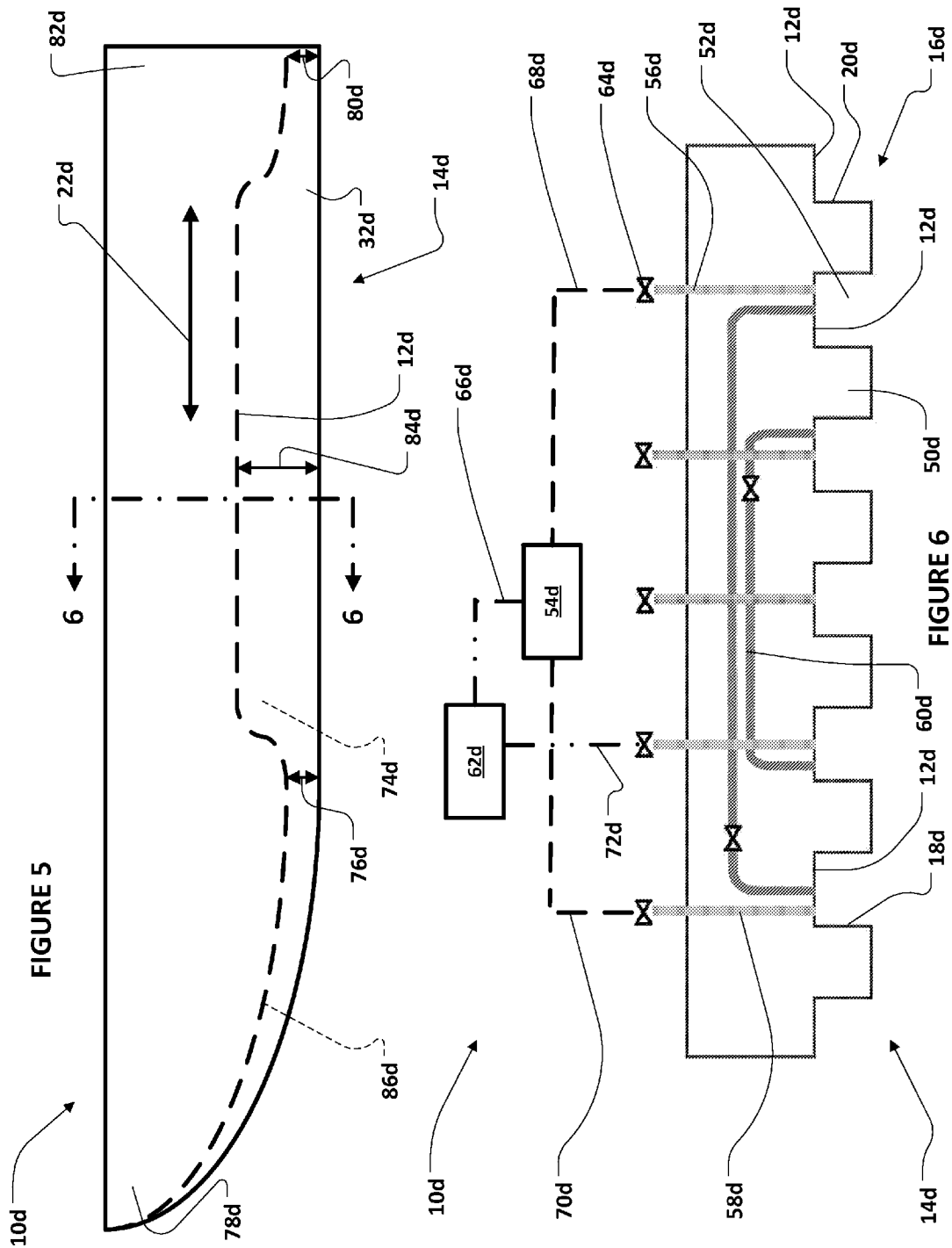

MARINE VESSEL HULL

BACKGROUND

1. Field

The present disclosure relates to marine vehicles and more particularly wherein the hull of the vessel is either so contoured that a groove-like configuration is formed in the bottom of the vessel, whereby a lifting force is generated.

2. Description of Related Prior Art

U.S. Pat. No. 5,934,218 discloses a PLANING VESSEL. The planing vessel has a hull and a propulsion and control system. The hull has a plane bottom formed of an equicrural triangle in the front and a rectangle at the back, two boards and one or more swell guideways. Each swell guideway has an inclined top line with a lower front and a higher back denting upwardly into and extending lengthwise throughout the bottom and paralleling its centerline. The hull also has a pair of wave-splash guards inlaid or dented one into the boards as an integrated body, a deck, a cabin and an upper construction. The planing vessel so formed can generate sufficient hydrodynamic buoyancy with reasonable distribution to quickly lift itself out of the water and enter a planing state. The planing vessel can have various fine performances, desirable speed and stability to move on rough waters.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

In summary, the invention is a marine vessel hull. The marine vessel hull includes a bottom surface. The marine vessel hull also includes at least first and second planing skis projecting from the bottom surface. Each of the first and second planing skis includes at least one side extending substantially perpendicular to the bottom surface. The first and second planing skis are sized to be submerged when the marine vessel hull is stationary in water. The bottom surface is substantially flat laterally between the first and second planing skis.

BRIEF DESCRIPTION OF THE DRAWINGS

The detailed description set forth below references the following drawings:

FIG. 3 is a partial rear view of a marine vessel hull according to another exemplary embodiment of the present disclosure;

FIG. 4 is a partial rear view of a marine vessel hull according to another exemplary embodiment of the present disclosure;

FIG. 5 is a side view of a marine vessel hull according to another exemplary embodiment of the present disclosure; and FIG. 6 is a cross-section taken through lines 6-6 in FIG. 5.

DETAILED DESCRIPTION

Figure 1:
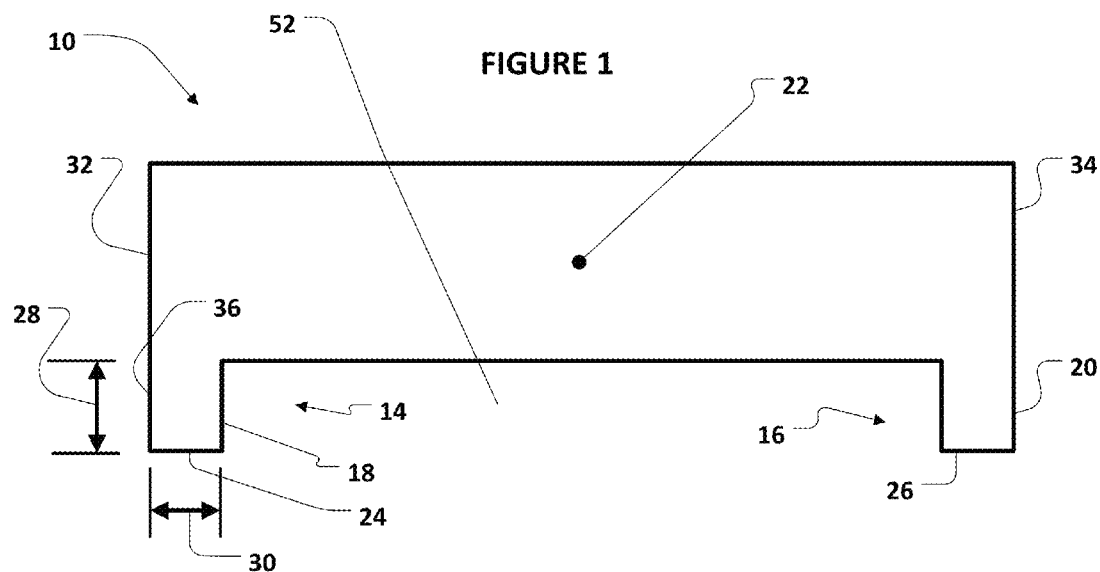
FIG. 1 is a rear view of a marine vessel hull according to an exemplary embodiment of the present disclosure.

A plurality of different embodiments of the present disclosure is shown in the Figures of the application. Similar features are shown in the various embodiments of the present disclosure. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, provides an improved boat hull design. An embodiment can be a twin hull, with a flat bottom and a ski-type structure. The skis can create a contained internal system that provides lift. The marine vessel hull can be more stable and requires much less force to be propelled though the water. The structure can be a flat-bottom design and drooping ski-type features that the vessel rides on as it skims along the surface. The wave on the insides of the opposing skis can provide a wave in the center of the boat that produces lift. The results are like that of a person on water skis. As soon as the person starts moving, the person is very quickly up out of the water and skimming the surface. The design is distinctly different from what is presently on the waterfront. This type of hull can be more capable of a larger payload with less power settings compared to vessels of similar size. This type of hull can also have the capacity to outperform in speed. Along with the superior performance, this type of hull can have the capacity to pass through rough water or high waves without having to throttle back, being less affected by windy conditions. The vessel can have a smooth ride and does not feel the sudden slowing down that other vessels do when hitting a high wave. The stability can be more enhanced as well. The design is sound and able to handle very rigorous conditions. Embodiments can also offer more options for the deck configurations.

FIG. 1 is a rear view of a marine vessel hull 10 according to an exemplary embodiment of the present disclosure. The marine vessel hull 10 includes a bottom surface 12. The marine vessel hull 10 also includes at least first and second planing skis 14, 16 projecting from the bottom surface 12. A lateral gap 52 is formed between the skis 14, 16. Each of the first and second planing skis 14, 16 includes at least one side 18, 20 extending substantially perpendicular to the bottom surface 12. The first and second planing skis 14, 16 are sized to be submerged when the marine vessel hull 10 is stationary in water. The bottom surface 12 is substantially flat laterally between the first and second planing skis 14, 16.

The skis 14, 16 can be sized similarly and can be positioned symmetrically with respect to a centerline of the marine vessel hull 10. The centerline of the marine vessel hull 10 can be an axis 22 extending in a fore-aft direction. The skis 14, 16 can mirror one another about the axis 22 of the marine vessel hull 10. The exemplary ski 14 can include a downwardly-facing planing surface 24. The exemplary ski 16 can include a downwardly-facing planing surface 26. A height 28 of the ski 14 can be defined between the downwardly-facing planing surface 24 and the bottom surface 12. The ski 14 can define lateral width 30.

In various embodiments, the height and lateral width of the skis can vary based on the size of the marine vessel hull. For example, for a marine vessel hull up to twenty feet in length, the height of the skis can be between twelve and sixteen inches. For larger marine vessel hulls, the height of the skis may be ten feet. The lateral width can be six to eight inches for marine vessel hulls up to twenty feet in length. In larger embodiments, the lateral width can be selected in view of the number of skis being applied.

The marine vessel hull 10 can include first and second opposite lateral sides 32, 34 extending substantially perpendicular to the bottom surface 12. In other embodiments of the present disclosure, the sides of the marine vessel hull can be transverse to the bottom surface 12. The first and second planing skis 14, 16 can be positioned at the first and second opposite lateral sides 32, 34. The exemplary surface 20 is flush and continuous with the surface 34. An outer side 36 of the exemplary ski 14 is flush and continuous with the surface 32.

Figure 2:
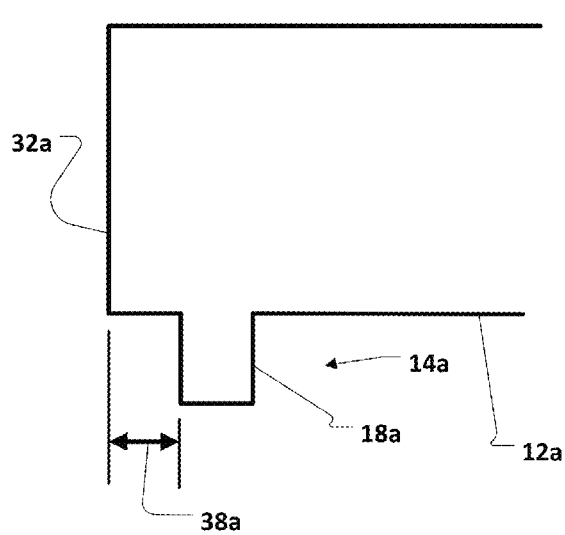
FIG. 2 is a partial rear view of a marine vessel hull according to another exemplary embodiment of the present disclosure.

FIG. 2 is a partial rear view of a marine vessel hull 10a according to an exemplary embodiment of the present disclosure. The marine vessel hull 10a includes a bottom surface 12a. The marine vessel hull 10a also includes at least first and second planing skis, such as ski 14a, projecting from the bottom surface 12a. Each of the first and second planing skis 14a includes at least one side, such as side 18a, extending substantially perpendicular to the bottom surface 12a. The first and second planing skis 14a are sized to be submerged when the marine vessel hull 10a is stationary in water. The bottom surface 12a is substantially flat laterally between the first and second planing skis 14a.

In this embodiment, the ski 14a is spaced from a lateral side 32a by an offset referenced at 38a. In various embodiments, the offset of the skis from the outer lateral surfaces of a marine vessel hull can vary based on the size of the marine vessel hull. For example, for a marine vessel hull up to twenty feet in length, the offset of the skis can be between eight and twelve inches. For larger marine vessel hulls, the height of the skis may be ten feet.

FIG. 3 is a partial rear view of a marine vessel hull 10b according to an exemplary embodiment of the present disclosure. The marine vessel hull 10b includes a bottom surface 12b. The marine vessel hull 10b also includes at least first and second planing skis, such as ski 14b, projecting from the bottom surface 12b. Each of the first and second planing skis 14b includes at least one side, such as side 18b, extending substantially perpendicular to the bottom surface 12b. The first and second planing skis 14b are sized to be submerged when the marine vessel hull 10b is stationary in water. The bottom surface 12b is substantially flat laterally between the first and second planing skis 14b.

In this embodiment, the planing skis define a stepped cross-section. The stepped cross-section of the ski 14b includes a first step portion 40b defining a first height 28b and a second step portion 42b defining a second height 44b. The first height 28b is greater than the second height 44b. The exemplary second step portion 42b is adjacent to the bottom surface 12b and positioned between the first step portion 40b and the bottom surface 12b. The second height 44b can vary. For example, for a marine vessel hull up to twenty feet in length, the second height 44b can be between six and eight inches. The planning surface width is referenced at 30b. The width of the second step portion 42b can vary. For example, for a marine vessel hull up to twenty feet in length, the width of the second step portion 42b can be between eight and ten inches.

FIG. 4 is a partial rear view of a marine vessel hull 10c according to an exemplary embodiment of the present disclosure. The marine vessel hull 10c includes a bottom surface 12c. The marine vessel hull 10c also includes at least first and second planing skis, such as ski 14c, projecting from the bottom surface 12c. Each of the first and second planing skis 14c includes at least one side, such as side 18c, extending substantially perpendicular to the bottom surface 12c. The first and second planing skis 14c are sized to be submerged when the marine vessel hull 10c is stationary in water. The bottom surface 12c is substantially flat laterally between the first and second planing skis 14c.

In this embodiment, the planing skis define a stepped cross-section. The stepped cross-section of the ski 14c includes a first step portion 40c defining a first height 28c. The stepped cross-section of the ski 14c also includes a second step portion 42c defining a second height 44c. The stepped cross-section of the ski 14c also includes a third step portion 46c defining a third height. In this example, the third height can be equal to the second height 44c. The first height 28c is greater than the second height 44c and the third height 48c. The second step portion 42c is adjacent to the bottom surface 12c and positioned between the first step portion 40c and the bottom surface 12c. The first step portion 40c is positioned between the second step portion 42c and the third step portion 46c.

FIG. 5 is a side view of a marine vessel hull 10d according to another exemplary embodiment of the present disclosure. FIG. 6 is a cross-section taken through lines 6-6 in FIG. 5. The marine vessel hull 10d extends along an axis 22d in the fore-aft direction and includes a bottom surface 12d. The marine vessel hull 10d also includes at least first and second planing skis 14d, 16d projecting from the bottom surface 12d. Each of the first and second planing skis 14d includes at least one side 32d, 20d extending substantially perpendicular to the bottom surface 12d. The first and second planing skis 14d, 16d are sized to be submerged when the marine vessel hull 10d is stationary in water. The bottom surface 12d is substantially flat laterally between the first and second planing skis 14d, 16d.

As shown in FIG. 6, the marine vessel hull 10d includes three or more planing skis, such as skies referenced at 14d, 16d, and 50d. Lateral gaps are defined between pairs of adjacent skis. For example, a lateral gap 52d is formed between the skis 16d, and 50d. The planing skis, including the referenced and unreferenced planning skis, can be evenly spaced from one another. The bottom surface 12d can be discontinuous and can be substantially flat laterally between adjacent pairs of skis. The lateral gaps between adjacent skis can be similarly sized. The lateral width each of the planing skis can be less than the width of each of the lateral gaps.

The marine vessel hull 10d can also include an air delivery system 54d. The air delivery system 54d can include a fan (internal, not shown). The air delivery system 54d can deliver or withdraw air to one or more conduits, such as referenced conduits 56d and 58d. The air delivery system 54d can be positioned one end of the conduits. Lines referenced at 68d and 70d represent lines of fluid communication; all lines of fluid communication are not shown to enhance the clarity of the Figure. The conduit 56d can extend from the end fluidly communicating with the air delivery system 54d to another end fluidly communicating with the lateral gap 52d. The marine vessel hull 10d can also include one or more conduits placing various lateral gaps in fluid communication with one another, such as conduit 60d. The exemplary conduit 60d is shown extending only between first lateral gap and second lateral gaps and thereby placing those gaps in fluid communication with one another. The conduit 58d is shown extending to an end (above the hull 10d) that is spaced from all of the lateral gaps. The marine vessel hull 10d can also include a controller 62d and valves, such as referenced valve 64d. FIG. 6 shows that a valve can be positioned along a conduit, such as conduit 60d, to selectively permit fluid communication between first and second lateral gaps. The controller 62d can control the air delivery system 54*d* to engage or disengage and can control the direction of the fan moving within the air delivery system 54*d*. The controller 62*d* can also control the operation of the valves to open or close. Lines referenced at 66*d* and 72*d* represent lines of control communication; all lines of control communication are not shown to enhance the clarity of the Figure. The movement of air between lateral gaps and to and from the air delivery system 54*d* can be controlled to enhance the stability of the marine vessel hull 10*d*.

As best shown in FIG. 5, the bottom surface 12*d* defines a pocket 74*d* along the axis 22*d*. The bottom surface 12*d* defines a first height 76*d* along the axis 22*d* proximate to a bow 78*d* of the marine vessel hull 10*d*. The bottom surface 12*d* also defines a second height 80*d* along the axis 22*d* proximate to a stern 82*d* of the marine vessel hull 10*d*. The bottom surface 12*d* also defines a third height 84*d* along the axis 22*d* between the first height 76*d* and the second height 80*d*. The first height 76*d* and the second height 80*d* are less than the third height 84*d*. FIG. 5 shows the exemplary third height 84*d* to be continuous along at least a portion of the axis 22*d* and fore and aft ends of the pocket 74*d* being substantially mirrored with respect to one another. The pocket 74*d* can hold air to assist in lifting the marine vessel hull 10*d* from the water during operation. The bottom surface 12*d* can extend in shape that is continuously convex from the first height 76*d* along the axis 22*d* to the bow 78*d* to scoop air into the pocket 74*d*. The continuously convex portion of the bottom surface 12*d* is referenced at 86*d*.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or sub-combinations that are disclosed herein as other present disclosures in other patent documents is hereby unconditionally reserved.

What is claimed is:

1. A marine vessel hull comprising:
   a bottom surface;
   at least first and second planing skis projecting from said bottom surface, wherein each of said first and second planing skis includes at least one side extending substantially perpendicular to said bottom surface and wherein said first and second planing skis are sized to be submerged when said marine vessel hull is stationary in water;
   wherein said bottom surface is substantially flat laterally between said first and second planing skis;
   wherein said at least first and second planing skis are further defined as three or more planing skis with respective lateral gaps defined between pairs of adjacent skis; and
   a first conduit extending only between a first lateral gap and a second lateral gap of said lateral gaps and thereby placing said first and second lateral gaps in fluid communication with one another.

2. The marine vessel hull of claim 1 further comprising:
   first and second opposite lateral sides extending substantially perpendicular to said bottom surface.

3. The marine vessel hull of claim 1 further comprising:
   first and second opposite lateral sides, wherein said at least first and second planing skis are positioned at said first and second opposite lateral sides.

4. The marine vessel hull of claim 1 wherein said three or more planing skis are evenly spaced from one another, said bottom surface being substantially flat laterally between adjacent skis.

5. The marine vessel hull of claim 1 wherein said lateral gaps between adjacent skis are similarly sized with respect to one another.

6. The marine vessel hull of claim 1 wherein each of said three or more planing skis define a lateral width being less than a width of one of said lateral gaps.

7. The marine vessel hull of claim 1 further comprising:
   a second conduit extending from a first end in one of said first and second lateral gaps to a second end spaced from all of said plurality of lateral gaps; and
   an air delivery system positioned at said second end to deliver air to said one of said first and second lateral gaps, said delivered air directed to the other of said first and second lateral gaps through said one of said first and second lateral gaps and said first conduit.

8. The marine vessel hull of claim 1 wherein each of said at least first and second planing skis define a stepped cross-section.

9. The marine vessel hull of claim 8 wherein said stepped cross-section includes a first step portion defining a first height and a second step portion defining a second height, said first height being greater than said second height.

10. The marine vessel hull of claim 9 wherein said second step portion is adjacent to said bottom surface and positioned between said first step portion and said bottom surface.

11. The marine vessel hull of claim 8 wherein said stepped cross-section includes a first step portion defining a first height, a second step portion defining a second height, and a third step portion defining a third height, wherein said first height is greater than said second height and said third height.

12. The marine vessel hull of claim 11 wherein said second step portion is adjacent to said bottom surface and positioned between said first step portion and said bottom surface and wherein said first step portion is positioned between said second step portion and said third step portion.

13. The marine vessel hull of claim 1 further comprising:
   a valve positioned along said first conduit to selectively permit fluid communication between said first and second lateral gaps.

14. A marine vessel hull comprising:
   a bottom surface;
   at least first and second planing skis projecting from said bottom surface, wherein each of said first and second planing skis includes at least one side extending substantially perpendicular to said bottom surface and wherein said first and second planing skis are sized to be submerged when said marine vessel hull is stationary in water;
   wherein said bottom surface is substantially flat laterally between said first and second planing skis;
   wherein each of said at least first and second planing skis includes a downwardly-facing planing surface and a height between said downwardly-facing planing surface and said bottom surface varies along an axis extending in a fore-aft direction;

wherein said bottom surface defines a pocket along said axis; and wherein said bottom surface defines a first height along said axis aft of a bow of said marine vessel hull and forward of said pocket, a second height along said axis proximate to a stern of said marine vessel hull and aft of said pocket, and a third height along said axis between said first height and said second height, wherein said first height and said second height are less than said third height and said pocket is defined by said third height.

15. The marine vessel hull of claim 14 wherein said bottom surface is further defined extending continuously convex from said first height along said axis to said bow.

16. The marine vessel hull of claim 15 further comprising:

a conduit extending from a first end fluidly communicating with said pocket of said bottom surface between said at least first and second planing skis and a second end spaced from the first end; and an air delivery system positioned at said second end to deliver air to said pocket.

17. The marine vessel hull of claim 14 wherein said third height is continuous along at least a portion of said axis and fore and aft ends of said pocket are substantially mirrored with respect to one another.

\* \* \* \* \*